United States Patent
Ho

[11] Patent Number: 5,940,265
[45] Date of Patent: Aug. 17, 1999

[54] DISKDRIVE SUSPENDING DEVICE FOR A COMPUTER

[76] Inventor: Hsin Chien Ho, 20F-1, 268, Sec. 1, Wen-Hua Rd., Pan Chiao, Taipei, Taiwan

[21] Appl. No.: 08/898,599

[22] Filed: Jul. 22, 1997

[51] Int. Cl.[6] .................................................. H05K 5/00
[52] U.S. Cl. ...................... 361/685; 312/223.2; 361/725
[58] Field of Search ..................................... 248/317, 300, 248/918; 312/223.2, 223.1; 361/683, 684, 685, 725, 729, 735

[56] References Cited

U.S. PATENT DOCUMENTS

| | | | |
|---|---|---|---|
| 5,398,157 | 3/1995 | Paul .......................................... | 361/684 |
| 5,438,476 | 8/1995 | Steffes ............................... | 312/223.2 X |
| 5,447,367 | 9/1995 | Wei ....................................... | 361/685 X |
| 5,463,527 | 10/1995 | Hager et al. ............................. | 361/685 |
| 5,564,804 | 10/1996 | Gonzalez et al. ..................... | 312/223.2 |
| 5,673,172 | 9/1997 | Hastings et al. ......................... | 361/685 |
| 5,682,291 | 10/1997 | Jeffries et al. ........................... | 361/685 |
| 5,768,099 | 6/1998 | Radloff et al. ........................... | 391/685 |
| 5,777,848 | 7/1998 | McAnally et al. ....................... | 361/725 |
| 5,788,211 | 8/1998 | Astier .................................. | 361/685 X |
| 5,788,347 | 8/1998 | Rabinovitz ....................... | 312/223.2 X |

Primary Examiner—Derek J. Berger
Attorney, Agent, or Firm—Bacon & Thomas

[57] ABSTRACT

A diskdrive suspending device suspended from a longitudinal rail and a vertical wall in a computer mainframe casing behind an opening of a face panel thereof to hold two diskdrives, including an upper diskdrive holder adapted for holding a diskdrive and having hooks extending from a top cover plate thereof and respectively hooked on the longitudinal rail and vertical wall of the computer mainframe casing and hook holes and retaining notches on a bottom wall of a casing thereof for the mounting of the lower diskdrive holder, and a lower diskdrive holder adapted for holding a diskdrive and having top hooks respectively hooked on the hook holes and retaining notches of the casing of the upper diskdrive holder.

1 Claim, 4 Drawing Sheets

DISKDRIVE SUSPENDING DEVICE FOR A COMPUTER

BACKGROUND OF THE INVENTION

The present invention relates to a diskdrive suspending device for a horizontal computer, and more particularly to such a diskdrive suspending device that can be conveniently installed in a computer mainframe casing for a horizontal computer to hold two diskdrives.

A computer mainframe casing generally comprises a diskdrive slot for access of a diskdrive. Because of limited space, this diskdrive slot is not suitable for mounting two or more diskdrives in a stack if the computer mainframe casing is designed for a horizontal computer. Therefore, it is very difficult to install additional diskdrives in a computer mainframe casing for a horizontal computer.

SUMMARY OF THE INVENTION

The present invention overcomes the aforediscussed disadvantage of the prior art. It is one object of the present invention to provide a diskdrive suspending device which can be conveniently installed in a computer mainframe casing for a horizontal computer to hold two diskdrives. It is another object of the present invention to provide a diskdrive suspending device which can be conveniently installed in a computer mainframe casing to hold diskdrives without the use of any external fastening elements. According to the preferred embodiment of the present invention, the diskdrive suspending device is adapted to be suspended from a longitudinal rail and a vertical wall in a computer mainframe casing behind an opening of a face panel thereof to hold two diskdrives. The diskdrive suspending device comprises an upper diskdrive holder adapted for holding a diskdrive and having hooks extending outwardly from a top cover plate thereof for respectively hooking on the longitudinal rail and vertical wall of the computer mainframe casing, and hook holes and retaining notches on a bottom wall of a casing thereof for the mounting of the lower diskdrive holder, and a lower diskdrive holder adapted for holding a diskdrive and having top hooks for respectively hooking on the hook holes and retaining notches of the casing of the upper diskdrive holder.

DETAILED DESCRIPTION OF THE PREFERRED EMBODIMENT

Figure 1:
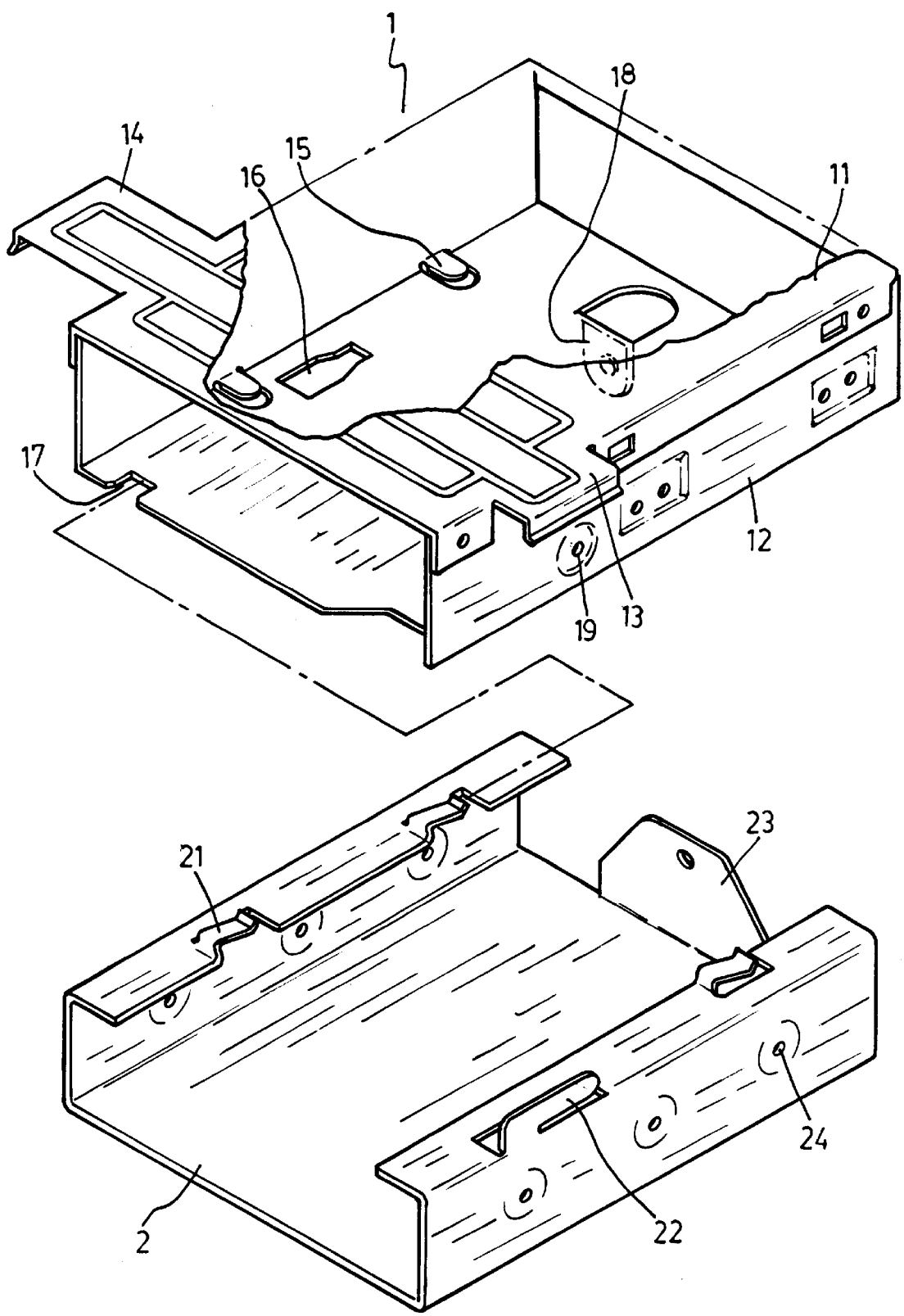
FIG. 1 is an exploded view of a diskdrive suspending device for a computer according to the present invention.
Figure 2:
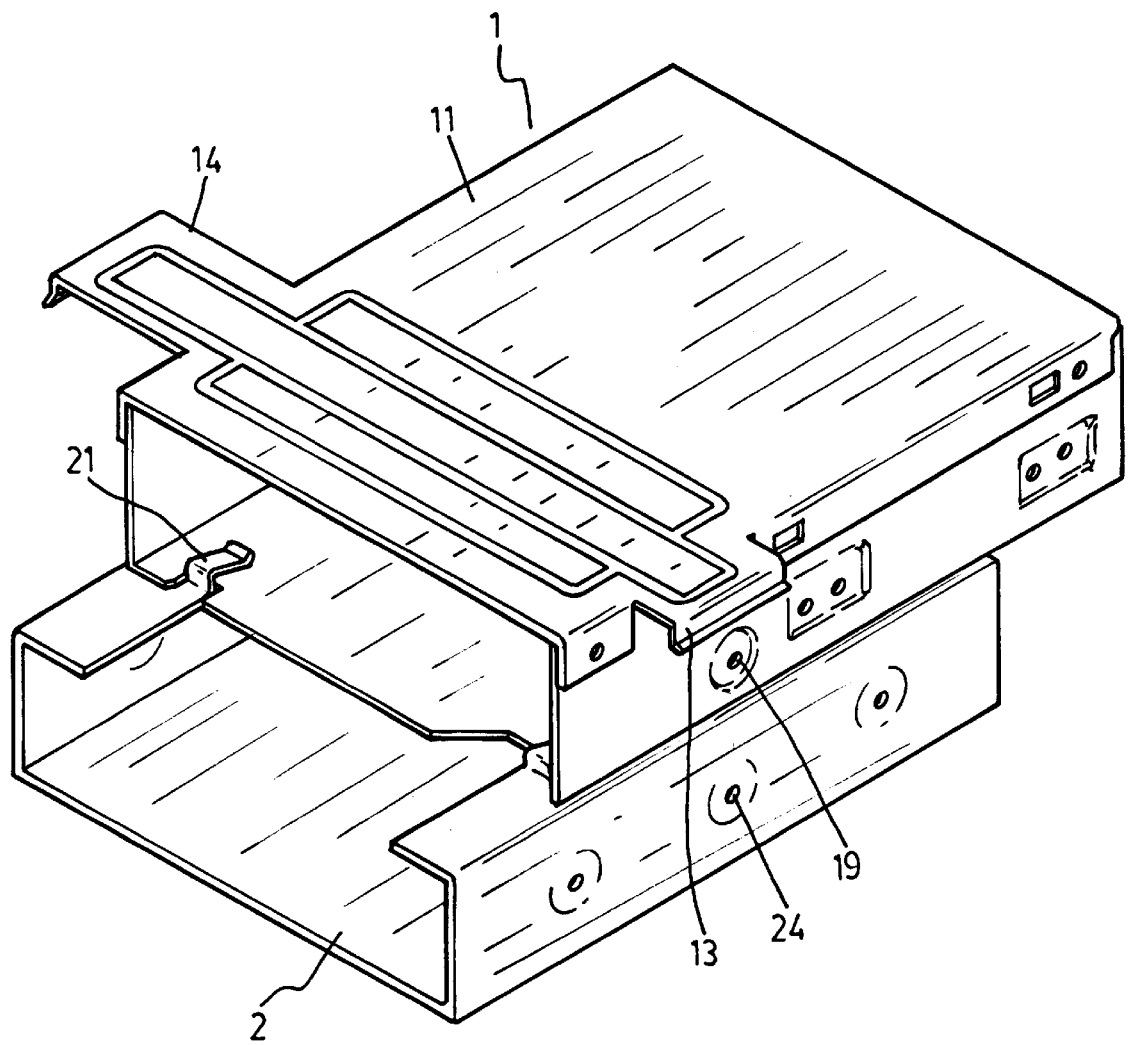
FIG. 2 is an assembly view of the diskdrive suspending device shown in FIG. 1.

Referring to FIGS. 1 and 2, a diskdrive suspending device in accordance with the present invention comprises an upper diskdrive holder 1, and a lower diskdrive holder 2 suspended from the upper diskdrive holder 1. The upper diskdrive holder 1 is comprised of a substantially rectangular casing 12 adapted for holding a diskdrive, and a top cover plate 11 covered on the casing 12. The top cover plate 11 comprises two outward hook plates 13;14 bilaterally disposed near its front side. The casing 12 comprises a plurality of locating strips 15 bilaterally suspended on the inside for supporting a diskdrive inside the casing 12, hook holes 16 and retaining notches 17, and a downward stop plate 18 extending from its bottom wall in the middle near the back, and a plurality of mounting holes 19 symmetrically disposed at its two opposite vertical side walls for the mounting of fastening elements to secure a diskdrive inside the casing 12. The lower diskdrive holder 2 is shaped like a channel plate adapted for holding a diskdrive, comprising a plurality of hooks 21;22 bilaterally extending from its top side and adapted for hooking on the hook holes 16 and retaining notches 17 of the casing 12 for permitting the lower diskdrive holder 2 to be suspended from the casing 12 of the lower diskdrive holder 2, an upright stop plate 23 extending from its bottom wall at the back side, and a plurality of mounting holes 24 symmetrically disposed at its two opposite vertical side walls for the mounting of fastening elements to secure a diskdrive inside the lower diskdrive holder 2. When the lower diskdrive holder 2 is fastened to the casing 12 of the upper diskdrive holder 1 by hooking up the hooks 21;22 of the lower diskdrive holder 2 with the hook holes 16 and retaining notches 17 of the casing 12, the downward stop plate 18 of the casing 12 of the upper diskdrive holder 1 is stopped in front of the upright stop plate 23 of the lower diskdrive holder 2 to prohibit forward movement of the lower diskdrive holder 2 relative to the upper diskdrive holder 1.

Figure 3:
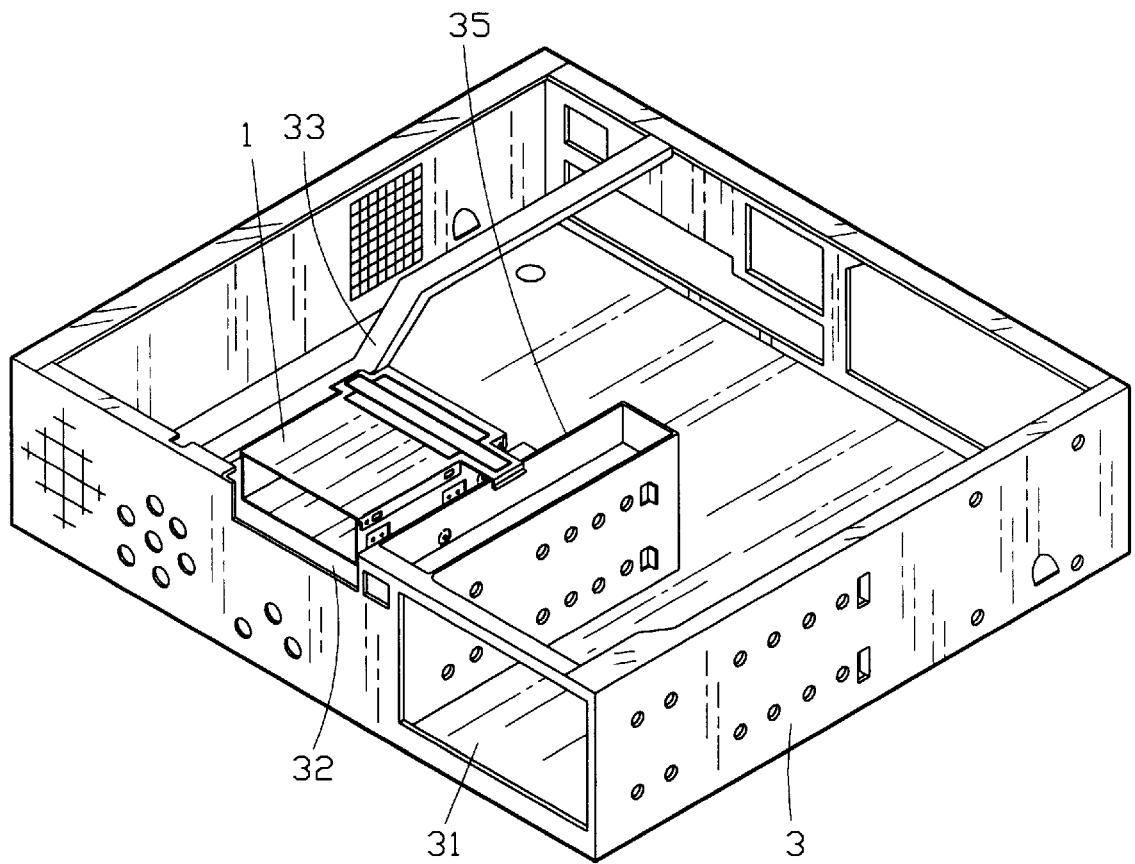
FIG. 3 shows the relationship between the diskdrive suspending device and the computer mainframe casing according to the present invention.
Figure 4:
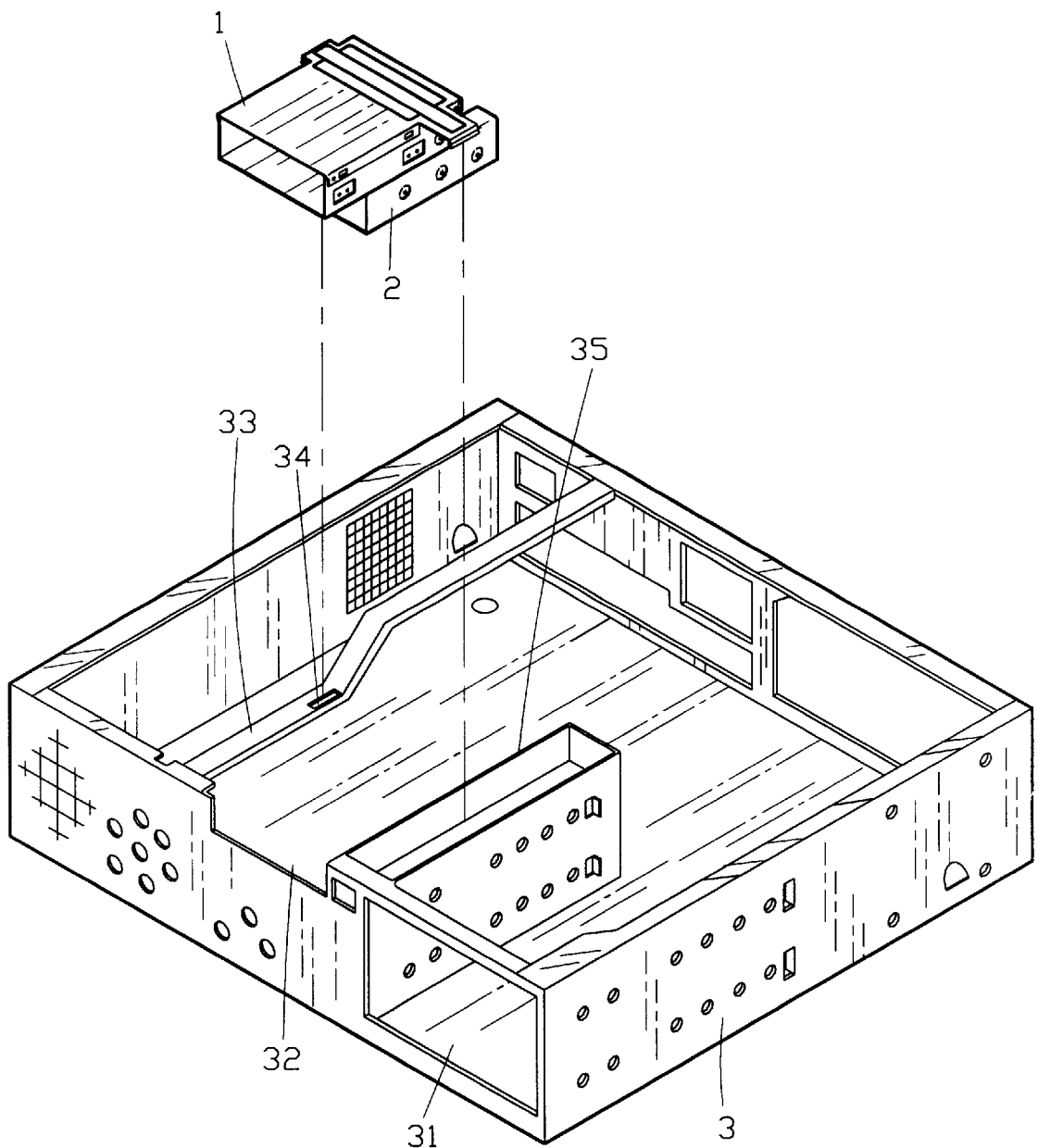
FIG. 4 shows the diskdrive suspending device installed in the computer mainframe casing according to the present invention.

Referring to FIG. 3, the computer mainframe casing, referenced by 3, comprises a diskdrive slot 31 at its front side into which a diskdrive case can be inserted and installed in the computer mainframe casing 3, an opening 32 at one side of the diskdrive slot 31, a vertical wall 35 extending from its bottom wall and extending rearwardly between the diskdrive slot 31 and the opening 32, and a longitudinal rail 33 suspended on the inside and disposed at one side of the opening 32 remote from and in parallel to the vertical wall 35. When the diskdrive suspending device is inserted into the computer mainframe casing 3 in between the longitudinal rail 33 and the vertical wall 35 and positioned at the opening 32, the outward hook plates 13;14 of the top cover plate 11 of the upper diskdrive holder 1 are respectively hooked in a hook hole 34 on the longitudinal rail 33 and the top edge of the vertical wall 35 to secure the diskdrive suspending device in place.

What the invention claimed is:

1. A diskdrive suspending device for suspending from a longitudinal rail and a vertical wall of a computer mainframe casing behind an opening of a face panel thereof to hold two diskdrives, the device comprising an upper diskdrive holder for suspending from the longitudinal rail and vertical wall of said computer mainframe casing and a lower diskdrive holder suspended from said upper diskdrive holder said upper diskdrive holder comprising a substantially rectangular casing adapted for holding a diskdrive, and a top cover plate covered on the casing of said upper diskdrive holder, said top cover plate comprising two outward hook plates disposed at two opposite sides thereof for respectively hooking on the longitudinal rail and vertical wall of said computer mainframe casing, the casing of said upper diskdrive holder comprising a plurality of hook holes and retaining notches, and a downward stop plate extending from a bottom wall thereof near a back side of the bottom wall, said lower diskdrive holder being shaped like a channel adapted for holding a diskdrive and comprising a plurality of hooks bilaterally disposed at a top thereof for respectively hooking on the hook holes and retaining notches of the casing of said upper diskdrive holder and permitting said lower diskdrive holder to be suspended from the casing of said upper diskdrive holder, and an upright stop plate extending from a back side of a bottom wall thereof and engaging the downward stop plate of the casing of said upper diskdrive holder.

* * * * *